Figure 1:
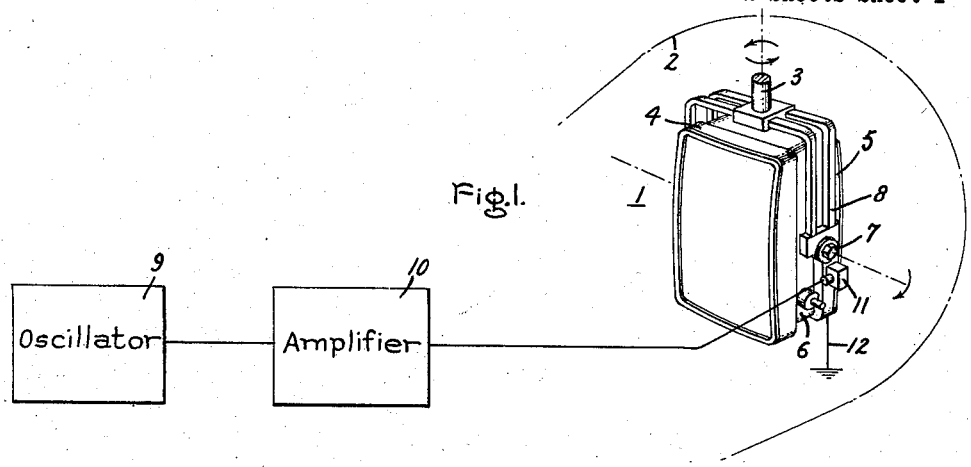

April 15, 1958 W. H. JANSSEN ET AL 2,831,175
ELECTROACOUSTIC TRANSDUCER
Filed Oct. 1, 1945 2 Sheets-Sheet 1

Inventors:
William H. Janssen,
Richard W. Samsel,
by Merton D Morse
Their Attorney.

April 15, 1958 W. H. JANSSEN ET AL 2,831,175
ELECTROACOUSTIC TRANSDUCER
Filed Oct. 1, 1945 2 Sheets-Sheet 2
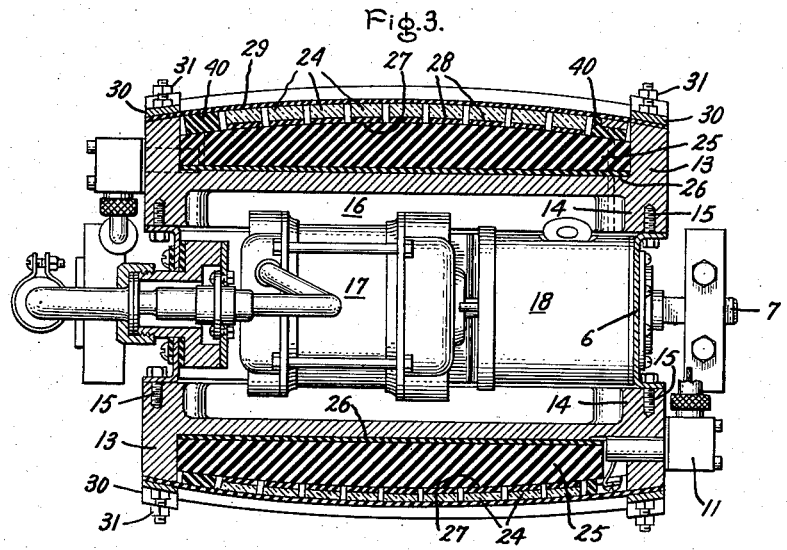
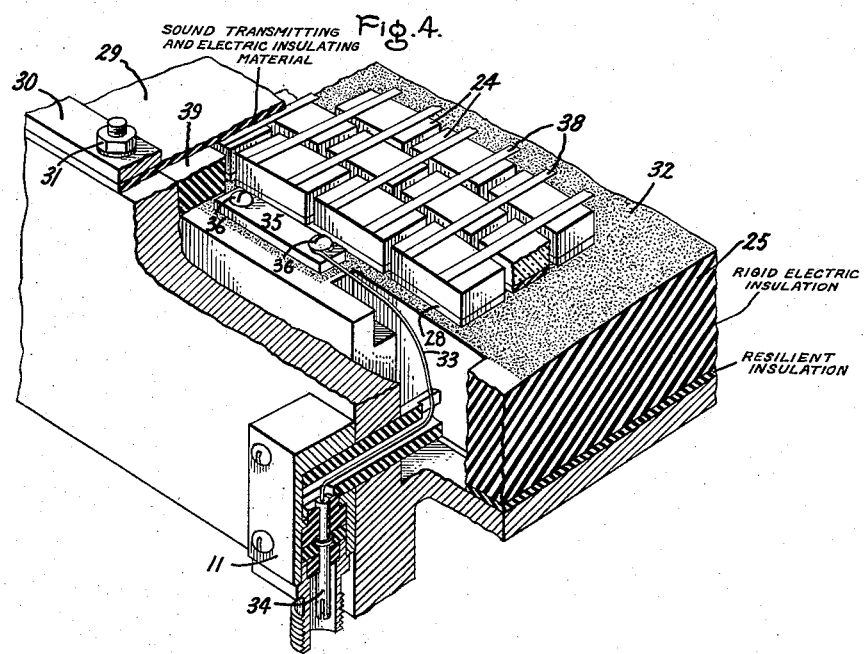
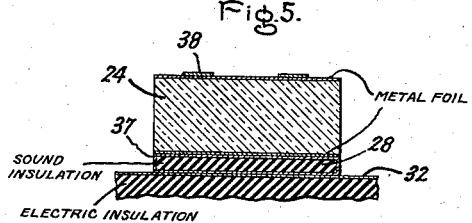
Inventors
William H. Janssen,
Richard W. Samsel,
by Merton D Moore
Their Attorney.

United States Patent Office 2,831,175
Patented Apr. 15, 1958

2,831,175

ELECTROACOUSTIC TRANSDUCER

William H. Janssen and Richard W. Samsel, Schenectady, N. Y., assignors to General Electric Company, a corporation of New York Application October 1, 1945, Serial No. 619,722

11 Claims. (Cl. 340—10)

This invention relates to electroacoustic transducers and particularly to such transducers for the underwater transmission of relatively wide beams of high intensity sound energy.

In the field of locating objects under water by the use of sound signals transmitted to and reflected from the objects, it has been the practice to apply narrow beams of high intensity sound energy at relatively low frequencies. In apparatus employing supersonic energy for obtaining an indication of the relative size and shape as well as the location of distant objects it becomes necessary to scan a large number of points over the area under investigation and it is desirable to transmit a relatively wide beam of sound energy in order to facilitate scanning of a wide area.

A piezoelectric crystal is one of the most useful devices for converting electrical signal energy into sound energy for underwater transmission. These crystals may be cut with their surfaces curved to determine the shape of the beam of sound energy produced; however, rectangular flat crystals are preferable for manufacturing and handling reasons. By employing a large number of crystals a required beam of wide cross sectional area may be secured. However, in portable apparatus and particularly in underwater apparatus mounted on ships or other vessels it is necessary to mount the crystal transducer for movement with respect to the ship to maintain fixed horizontal and vertical axes regardless of rolling and pitching of the ship; the crystal assembly for such transducers must be made as small as practicable. Accordingly it is an object of this invention to provide an improved electroacoustic transducer utilizing piezoelectric crystals for transmitting under water a wide beam of sound energy.

It is another object of this invention to provide an improved piezoelectric transducer for transmitting a wide beam of sound energy under water and which shall be of compact and rugged construction.

It is another object of this invention to provide an electroacoustical transducer for transmitting sound energy under water employing a piezoelectric crystal and including an improved arrangement for mounting the crystal.

It is a further object of this invention to provide an electroacoustic transducer employing a large number of piezoelectric crystals to transmit under water a wide beam of sound energy and including an improved arrangement for mounting the crystals.

Figure 2:
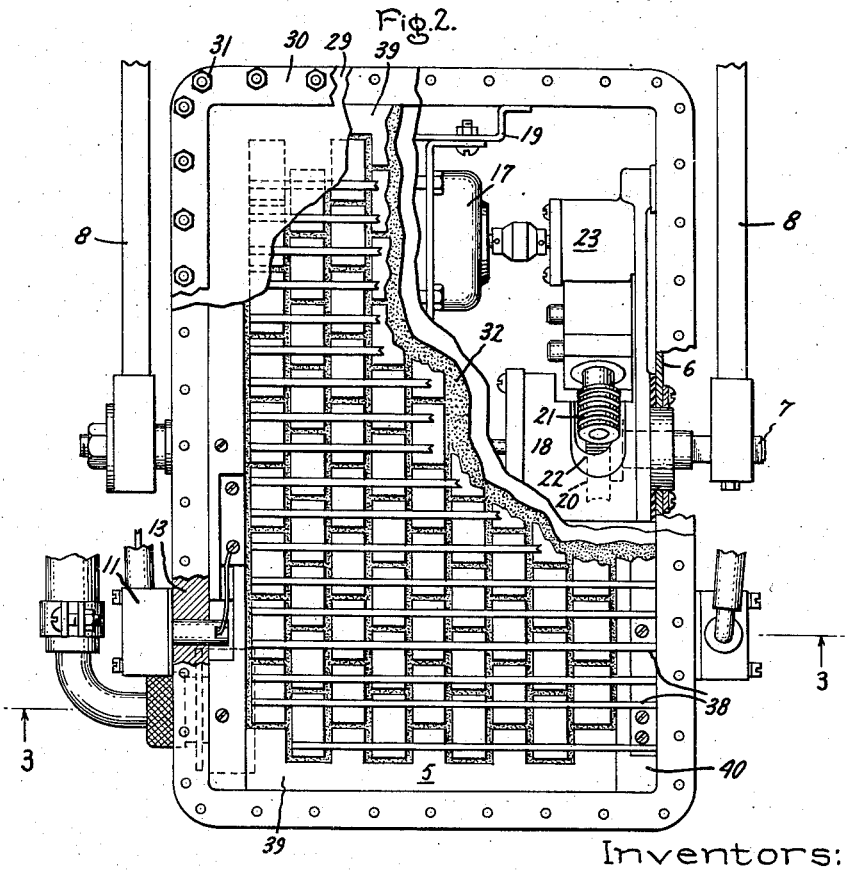

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which Fig. 1 represents diagrammatically an underwater sound transmitting apparatus provided with a transducer embodying the invention; Fig. 2 is a front elevation view of the transducer shown in Fig. 1, with portions broken away; Fig. 3 is a sectional view on the line 3—3 of Fig. 2; Fig. 4 is an enlarged perspective view of a portion of the transducer shown in Fig. 2; and Fig. 5 is an enlarged sectional view through one of the individual crystal mountings of the transducer.

Referring now to the drawing Fig. 1 represents an under water sound transmitting apparatus comprising a transducer assembly 1 which is mounted for movement within an underwater sound transmitting casing partially indicated by a dotted line 2. The transducer 1 is arranged to be rotated about a shaft 3 which may also be rocked about a horizontal axis (not indicated) above the transducer. This type of transducer is normally mounted on a ship and is controlled by a suitable stabilizing apparatus to maintain fixed the vertical and horizontal axes of the transducer regardless of rolling and pitching of the ship; the horizontal axis above the transducer which has been referred to is the axis about which the pitch correction is effected. An arrangement suitable for mounting the transducer of the present invention is described and claimed in copending application Serial No. 619,642, filed in the name of Francis R. Ellenberger of even date herewith and assigned to the assignee of the present invention. The transducer assembly 1 comprises two transducers 4 and 5 mounted on either side of a central housing 6 which is pivotally mounted for rotation about a shaft 7 rigidly held in a U-shaped hanger 8 rigidly connected to the shaft 3. The transducer assembly may be tilted about the axis of the shaft 7 to determine the angle of declination of the assembly with respect to the horizontal. The transducer 4 is provided with piezoelectric crystals for operation at a higher frequency than the crystals of the transducer 5 so that either of two frequencies may be transmitted; the crystals in only one of the transducers are energized at a given time. In order to energize the crystals of the transducer 5 an electronic oscillator 9 and an amplifier 10 are connected through a fitting 11 to the crystals within the transducer 5. Similar oscillator and amplifier units (not shown) are employed for energizing the crystals of the transducer 4 at the higher frequency. The outer casings of the transducers 4 and 5 are of conducting material and are grounded through a connection 12.

The arrangement of the piezoelectric crystals in both the transducers 4 and 5 is the same except for the difference in size of the crystals as determined by the difference in the two frequencies, and the corresponding parts of the two transducers have been designated by the same numerals. Each transducer as shown in Figs. 2 and 3 comprises a metal supporting frame or casing 13 and the two frames 13 are mounted back to back and separated by the central housing 6 which is secured to flanges 14 at the backs of the frames by cap screws 15. The frames 13 and the housing 6 together form a waterproof housing enclosing a compartment 16 within which are arranged an electric driving motor or selsyn 17 and a gear assembly 18 for adjusting the position of the transducer assembly about the axis of the shaft 7. The motor 17 is secured to the housing 6 on a bracket 19 and the gear housing 18 is also securely clamped to the housing. Within the housing 18 is arranged a gear 20 rigidly secured to the shaft 7 and engaging a worm gear 21 through an opening 22 in the housing. The gear 21 is driven by the motor or selsyn 17 through a suitable gearing 23, and upon rotation of the motor, the gear 21 moves around the gear 20 and carries the transducer assembly with it about the shaft 7 thereby changing the angle of the transducer with respect to the vertical shaft 3 and determining the angle of declination of the transducer. Each transducer comprises a plurality of rectangular piezoelectric crystals 24 arranged in rows with the crystals staggered in adjacent rows. The crystals are mounted on a block 25 of rigid insulating material, such as, for example, polystyrene, phenol formaldehyde plastic or polymerized methyl methacrylate, which is secured within the frame 13, a sheet of resilient insulating material 26 being provided between the block 25 and the back wall of the frame to facilitate the fitting of the block 25 against the wall. The outer surface of the block is convexly curved, as indicated at 27, and in the transducers shown in the drawings the outer faces of the blocks 25 are spherical. The flat crystals 24 are mounted on the block 25 by means of flat topped pads 28 of resilient sound insulating material which may be shaped to conform to the spherical surface of the block. A suitable material for sheet 26 and for pads 28 may comprise granular cork in a rubber or rubber-like binder. A cover 29 of sound transmitting material, such as rubber, is secured over the faces of the crystals and is attached to the frame by a clamping frame 30 and a plurality of bolts 31. The frame 30 clamps the cover 29 against the frame 13 and thereby encloses the crystals 24 within a fluid-tight chamber. The crystals 24 may be constructed of Rochelle salt or other suitable material and the space within the chamber formed by the cover 29 is filled with a suitable electric insulating liquid, such as castor oil, which prevents deterioration of the crystals by minimizing the possibility that moisture will come into contact with the crystals.

The crystals are provided with conducting coatings such as metal foil on their opposite faces and are energized by suitable electrodes arranged on the opposite faces in contact with the coatings and which are clearly shown in Figs. 2 and 4. The face area of the block 25 is covered with a conducting sheet or layer 32 which is connected by a conductor 33 to a plug connection 34 in the fitting 11, conductor 33 being secured to a conducting block 35 which is clamped against the coating 32 by suitable screws 36. The coating 32 terminates short of the metal frame 13 and is thereby insulated from the grounded frame. In order to connect the crystals to the conducting area 32 each of the resilient pads 28 is provided with a wrapping 37 of metal foil or other suitable conducting material which connects the conducting area 32 to the face of the crystals adjacent the pads 28 and provides a first electrode for the crystal. The opposite faces of the crystals are connected to strips 38 of metal foil, two of the strips contacting each of the crystals and all of the strips being secured at one end to the metal frame 13 where they are clamped against the frame between the cover 29 and the edge of the frame. The strips 38 are cemented or glued to the crystals to hold them in good conducting engagement with the outer faces of the crystals thereby providing the second electrodes for all the crystals. In order to fill the spaces about the crystals at the sides and ends of the rows, insulating strips 39 and 40, respectively, are provided. All the crystals are spaced with adjacent crystals and the curvature of the outer face of the transducer is spherical in conformation with the face of the outer block 25. All the crystals are cut in rectangular form and along axes such that when they are energized by high frequency signals applied between the electrodes they vibrate perpendicularly of the face of the transducer and each crystal projects a beam of sound energy outwardly and generally along a radius of curvature of the spherical face of the transducer. The staggering of the crystals in adjacent rows provides twice the number of angular positions and more closely approximates the effect of a continuous spherical surface. The composite beam formed by the multiplicity of crystals is a wide beam of high intensity energy, the width of the beam being determined by the radius of curvature of the spherical surface and by the shape of the group of crystals. For example, the beam projected by a transducer such as shown in the drawing has a generally rectangular cross section taken perpendicularly of the central radial axis of the spherical surface.

The pads 28 act to prevent or minimize the transmission of sound energy from the back face of the crystal to the block 25 and the transducer assembly. The crystals 24 are half wavelength crystals and are arranged to transmit sound energy to the liquid in front of the crystals by inertia drive. Both surfaces of the crystals vibrate but the pads 28, which are constructed of a resilient sound insulating material which will not transmit any appreciable amount of the sound vibrations, prevent the transmission of sound through the block 25. The other faces of the crystals, however, are connected through the layer of castor oil and the rubber cover 29 for direct transmission of sound to the water surrounding the transducer and the crystals are thus loaded or damped so that the energy is transmitted outwardly through the cover into the water.

During the operation of the sound transmitting apparatus illustrated the transducer assembly 1 is rotated continuously and sound is transmitted from either the transducers 4 or 5 during a predetermined portion of each revolution. High frequency voltage is applied between the electrodes 37 and 38 and all the crystals are simultaneously energized so that they transmit a composite beam the form and character of which are determined by the shape of the mounting block 25.

While the invention has been described in connection with a particular type of underwater transducer, other applications will readily be apparent to those skilled in the art. It is not, therefore, desired that the invention be limited to the specific construction shown and described, and it is intended by the appended claims to cover all modifications within the spirit and scope of the invention.

What we claim as new and desire to secure by Letters Patent of the United States is:

1. An electroacoustic transducer comprising a rigid support having a conducting face area, a piezoelectrical crystal, a backing pad of resilient sound insulating material having a conducting outer covering for mounting said crystal on said support in electrical conducting relation with said face area, an electrode engaging the face of said crystal on the side opposite said pad, means including a cover of sound transmitting electrical insulating material for providing a fluid-tight chamber enclosing said crystal, a body of electric insulating sound transmitting liquid about said crystal and filling said chamber, and conducting means connected to said face area and to said electrode for connecting said crystal in an electric circuit.

2. An electroacoustic transducer comprising a rigid support having a conducting face area, a piezoelectric crystal, a backing pad of resilient insulating material for mounting said crystal on said area of said support, a sheet metal foil wrapped about said pad to connect said crystal to said conducting area to provide a first electrode for said crystal, means including a cover of sound transmitting electrical insulating material for providing a fluid-tight chamber enclosing said crystal, a strip of metal foil arranged between said cover and the adjacent face of said crystal to provide a second electrode for said crystal, a body of insulating liquid filling said chamber about said crystal, and conducting means connected to said first and second electrodes for connecting said crystal in an electric circuit.

3. An electroacoustic transducer comprising a rigid support having a conducting face area, a plurality of piezoelectric crystals, a plurality of backing pads of resilient insulating material for mounting said crystals in spaced positions on said area of said support, sheets of metal foil wrapped about said pads to connect the respective crystals to said conducting area and to provide individual electrodes for said crystals, means including a cover of sound transmitting electrical insulating material for providing a fluid-tight chamber enclosing said crystals, strips of metal foil arranged between said cover and said crystals for providing second electrodes for said crystals, a body of insulating liquid filling said chamber about said crystals, and means connected to said conducting area and to said second electrodes for connecting said crystals in an electric circuit.

4. An electroacoustic transducer comprising a metal frame, a block of rigid insulating material mounted on said frame, a conducting sheet insulated from said frame and covering at least a portion of the outer face area of said block, a piezoelectric crystal, a backing pad of resilient insulating material having a conducting outer covering for mounting said crystal on said support in conducing relation with said sheet, an electrode engaging the face of said crystal on the side opposite said pad, means including a cover of sound transmitting electrical insulating material secured to said frame for providing a fluid-tight chamber enclosing said crystal, a body of insulating liquid about said crystal and filling said chamber, and conducting means connected to said sheet and to said electrode for connecting said crystal in an electric circuit.

5. An electroacoustic transducer comprising a metal frame, a block of rigid insulating material mounted on said frame and having a curved face area, a conducting sheet insulated from said frame and secured to said block over said face area, a plurality of piezoelectric crystals, a plurality of backing pads of resilient insulating material for mounting said crystals in spaced positions over said face area, sheets of metal foil extending around said pads to connect the respective crystals to said conducting sheet and provide individual electrodes for said crystals, electrode means engaging the faces of said crystals on the sides opposite said pads, means including a cover of sound transmitting electrical insulating material for providing a fluid-tight chamber enclosing said crystals, a body of insulating liquid about said crystals and filling said chamber, and means for connecting said electrodes and said electrode means across a source of electrical energy whereby said crystals transmit sound energy in a pattern determined by the shape of said face area.

6. An electroacoustic transducer comprising a metal frame, a block of rigid insulating material mounted on said frame and having a convex spherical face area, a conducting sheet insulated from said frame and secured to said block over said face area, a plurality of piezoelectric crystals, a plurality of backing pads of resilient insulating material for mounting said crystals in spaced positions over said face area, sheets of metal foil extending around said pads to connect the respective ones of said crystals to said conducting sheet and provide individual electrodes for said crystals, electrode means engaging the faces of said crystals on the sides opposite said pads, means including a cover of sound transmitting electrical insulating material for providing a fluid-tight chamber enclosing said crystals, a body of insulating liquid about said crystals and filling said chamber, and means for connecting said electrodes and said electrode means across a source of electrical energy whereby said crystals cooperate to transmit a relatively wide beam of sound energy.

7. An electroacoustic transducer comprising a rigid support, a block of rigid insulating material mounted on said support and having a curved surface, a plurality of flat rectangular piezoelectric crystals arranged in spaced rows over the area of said surface, the crystals in adjacent rows being staggered whereby the number of angular positions of individual transmitted beams is multiplied for a given number of crystals, conducting means including electrodes for opposite faces of said crystals for connecting said crystals in an electric circuit, and means enclosing said crystals in a sound transmitting fluid-tight chamber.

8. An electroacoustic transducer comprising a rectangular metal frame, a block of rigid insulating material mounted in said frame and having a convex spherical surface area, a layer of conducting material insulated from said frame and arranged over said area, a plurality of relatively flat rectangular piezoelectric crystals, a plurality of backing pads of resilient insulating material for mounting said crystals spaced from one another and in spaced rows over said area, sheets of conducting material extending around said pads to connect the respective crystals to said conducting layer thereby providing individual first electrodes for said crystals, a plurality of strips of foil extending across said rows of crystals for providing second electrodes for said crystals, means including a cover of sound transmitting electrical insulating material for providing a fluid-tight chamber enclosing said crystals, a body of insulating liquid filling said chamber, and means for connecting said first and second electrodes across a source of alternating electrical energy whereby said crystals transmit sound energy over a wide beam as determined by the radius of curvature of said spherical surface area.

9. An electroacoustic transducer comprising a rigid support, a block of rigid insulating material mounted on said support and having a curved surface, a layer of conducting material arranged over said surface, a large number of flat rectangular piezoelectric crystals arranged on said surface in closely spaced relation, means providing electrodes for opposite faces of said crystals, means enclosing said crystals in a sound transmitting fluid-tight chamber, and conducting means connected to said layer and to said electrodes for connecting said crystals in an electric circuit.

10. An electroacoustic transducer comprising a rigid support having a conductive face area, a piezoelectric crystal, a member of resilient sound insulating material for mounting said crystal on said support at a predetermined distance from said face area, said member having a conducting foil extending from a portion of said member in contact with said face area to a portion in contact with a face of said crystal to establish electrical connection therebetween, an electrode engaging an opposite face of said crystal, means including a cover of sound transmitting electrical insulating material for providing a fluid tight casing for said crystal, a body of electric insulating sound transmitting liquid in contact with the uncovered surfaces of said crystal and of said electrode and filling said chamber, and conducting means connected to said face area and to said electrode for connecting said crystal in an electric circuit.

11. An electroacoustic transducer comprising a rigid support, a block of rigid material mounted on said support and having a curved surface, a large number of flat piezoelectric crystals arranged on said surface, each of said crystals being separated from said surface by an interposed member of resilient material, means providing electrodes for opposite faces of said crystals, and means for establishing electrical connections to said electrodes.

References Cited in the file of this patent

UNITED STATES PATENTS

| | | |
|---|---|---|
| 1,939,302 | Heaney | Dec. 12, 1933 |
| 2,086,891 | Bachmann et al. | July 13, 1937 |
| 2,399,820 | Morgan | May 7, 1946 |
| 2,438,936 | Mason | Apr. 6, 1948 |

U. S. DEPARTMENT OF COMMERCE
PATENT OFFICE

CERTIFICATE OF CORRECTION

April 15, 1958

Patent No. 2,831,175

William H. Janssen et al.

It is hereby certified that error appears in the printed specification of the above numbered patent requiring correction and that the said Letters Patent should read as corrected below.

Column 5, lines 14 and 15, for "conducing" read --conducting--.

Signed and sealed this 3rd day of June 1958.

(SEAL)

Attest:
KARL H. AXLINE
Attesting Officer

ROBERT C. WATSON
Commissioner of Patents